United States Patent [19]

Inoue

[11] 4,450,336

[45] May 22, 1984

[54] SUPER-FINE FINISH EDM METHOD AND APPARATUS

[75] Inventor: Kiyoshi Inoue, Tokyo, Japan

[73] Assignee: Inoue-Japax Research Incorporated, Yokohama, Japan

[21] Appl. No.: 288,054

[22] Filed: Jul. 29, 1981

[30] Foreign Application Priority Data

Aug. 5, 1980 [JP] Japan .............................. 55-107395

[51] Int. Cl.³ .............................................. B23P 1/08
[52] U.S. Cl. .............................. 219/69 M; 219/69 G; 315/207
[58] Field of Search ................ 219/69 P, 69 M, 69 G, 219/69 S, 68, 69 C; 315/207, 227 A

[56] References Cited

U.S. PATENT DOCUMENTS

| | | | |
|---|---|---|---|
| 3,056,065 | 9/1962 | Porterfield | 315/207 |
| 3,109,120 | 10/1963 | Scarpelli | 315/207 X |
| 3,956,609 | 5/1976 | Marendaz | 219/69 P |
| 4,162,425 | 7/1979 | Larsen et al. | 315/207 |
| 4,237,370 | 12/1980 | Ullmann | 219/69 P |
| 4,335,294 | 6/1982 | Inoue | 219/69 P |

FOREIGN PATENT DOCUMENTS 1168610 10/1969 United Kingdom .............. 219/69 P

Primary Examiner—M. H. Paschall
Attorney, Agent, or Firm—Karl F. Ross; Herbert Dubno

[57] ABSTRACT

An EDM method and apparatus wherein a tool electrode is spacedly juxtaposed with a conductive workpiece across a machining gap filled with a dielectric liquid and a succession of localized, time-spaced, repetitive and randomly dispersed machining electrical discharges are effected between the tool electrode and the workpiece across the machining gap to remove stock from the workpiece uniformly over the surface thereof juxtaposed with the tool electrode. The surface finish of the stock-removed surface of the workpiece is improved by discharging electrical charge stored due to a stray capacitance across the tool electrode and the workpiece, through an electrical shunt circuit in parallel with the machining gap immediately prior to initiation of each of the machining electrical discharges across the machining gap.

30 Claims, 12 Drawing Figures

SUPER-FINE FINISH EDM METHOD AND APPARATUS

FIELD OF THE INVENTION

The present invention relates to an electrical discharge machining (EDM) method and apparatus for machining a conductive workpiece in which a tool electrode is spacedly juxtaposed with the workpiece to define a machining gap therewith filled with a dielectric liquid and a succession of localized, time-spaced and randomly dispersed machining electrical discharges are effected between the tool electrode and the workpiece across the machining gap to remove stock from the workpiece uniformly over the surface juxtaposed with the tool electrode.

BACKGROUND OF THE INVENTION

The EDM process makes use of electroerosive power pulses applied between a workpiece and a tool electrode spacedly juxtaposed across a machining gap filled with a dielectric liquid (e.g. Kerosene or distilled water) which also serves to carry away from the machining gap the detritus of the electrical discharge machining process.

The tool electrode is generally formed with the desired configuration of the cavity or shape complementarily desired in the workpiece. A train of power pulses are then formed to create localized, discrete and randomly dispersed stock removal discharges which produce cumulatively overlapping craters in the workpiece surface; the total surface juxtaposed with the tool electrode is thus machined uniformly over the parts thereof confronting the tool electrode and receives a configuration conforming to the shape of the tool electrode. In traveling-wire or wire-cut electrical discharge machining (TW-EDM), the tool electrode is constituted by a continuous, axially-traveling elongate wire-like electrode and a two- or three-dimensional relative displacement between the wire and the workpiece yields a desired shaped configuration in or on the workpiece.

During the machining operation, small metallic or conductive chips or particles removed from the electrode surfaces as well as other discharge products such as tar and gases are carried away by the liquid dielectric which floods the gap and is generally circulated therethrough while the tool electrode is advanced relative to the workpiece by a servo system designed to maintain a predetermined gap spacing substantially constant or to approach the desired gap spacing as accurately as possible. The servo arrangement may also function to respond to gap short-circuiting and arcing conditions to retract the electrode relative to the workpiece thereby removing such conditions.

It can also be stated that in an EDM process, electric energy is furnished from the power supply in the form of discrete electrical pulses across the machining gap filled with a liquid dielectric to effect a succession of electrical discharges between the tool electrode and the workpiece to remove stock from the latter. Each individual discharge strikes that area of the workpiece juxtaposed with the tool electrode on one minute localized zone or another, the zone being impulsively melted and/or vaporized and mechanically dislodged from the workpiece area by the impulsive discharge pressure. Successive and repetitive discharges are used to sweep the localized stock dislodgment or removal action over the entire workpiece area and result in the formation of cumulatively over-lapped discharge craters thereon. As stock removal proceeds, the tool electrode is advanced relatively towards the workpiece by servo feed means adapted to maintain the machining gap spacing substantially constant and thereby to allow stock removal discharges to be successively created. The tool electrode in sinking-type EDM is generally formed with the desired configuration of the cavity or shape complementarily desired in the workpiece. Thus, the total surface eventually juxtaposed with the tool is machined over those portions thereof which confront the tool electrode and receives a configuration conforming to the shape of the tool electrode. In travelling-wire or wire-cut EDM in which the tool electrode is formed by a continuous, axially traveling elongate wire-like electrode or in scanning-type EDM using a rod or the like electrode having a relatively simple machining contour, a two- or three- dimensional relative displacement is effected between the electrode and the workpiece to yield a desired shaped configuration in or on the workpiece corresponding to the path of the relative displacement. The contamination of the machining gap region with chips, tar and gases produced by machining discharges may be eliminated by continuously or intermittently flushing the gap with a fresh machining fluid and/or intermittently or cyclically retracting the tool electrode away from the workpiece to allow the fresh machining medium to be pumped into the machining gap and the machining contaminants to be carried away from the latter.

Parameters of individual and successive electrical discharges or machining current pulses, especially pulse on-time $\tau on$ and peak current Ip are, for a given combination of electrode materials and other machining settings, determinative of stock removal characteristics per single pulse delivery and hence of critical machining results, i.e. removal rate, surface roughness and relative electrode wear and, therefore, must be adjusted, in conjunction with pulse off-time, to establish a particular machining condition suitable to yield the desired machining results. These parameters are adjusted individually at pulse source circuitry in the power supply or a pulse generator which is, preferably, of solid-state or semiconductor switching type.

The present inventor has observed that in a conventional EDM arrangement, no matter how accurate the setting of these parameters is done at the pulse source in the power supply, the pulse becomes distorted while being generated and transmitted to the gap through the gap discharge circuit. It has been observed that the distortion is brought about due to stray capacitances inherently distributed in the gap discharge circuitry, which circuitry includes the machining gap between the tool electrode and the workpiece separated by the dielectric liquid, a semiconductor power switching network for pulsing a DC source, various leads in the power supply, cables connecting the power switch to the gap site, and conductors leading from the power cables for directly energizing the tool electrode and workpiece, and also to some extent environmental circuit units for mechanical arrangements. Heretofore, little care has been exercised with the respect to these stray capacitances contained in the gap discharge circuit. The present inventor has now noted that these stray capacitances have significant influences, which cannot be neglected, on the characteristics of a discharge pulse which eventually develops across the machining gap.

Specifically, stray capacitances are present generally across the machining gap between the tool electrode and the workpiece separated by the dielectric liquid, at the interfaces between the emitter and base of a semiconductor element in the switch unit for pulsing a DC power supply to produce the power pulses, and between the parallel conductors in a printed circuit board, lead cables, and at the portions of insulators for the electrode supporting head and for the workpiece support. In total the stray capacitances have been found to amount to 100 to 1000 picofarads or more in a conventional EDM arrangement using, as a dielectric liquid, kerosene having a specific resistivity of $10^{10}$ to $10^{12}$ ohm-cm for machining a workpiece area in excess of 4 $cm^2$. It has now been discovered that the presence of stray capacitances of such magnitude is a significant cause of, among other things, a tendency towards gap short-circuiting and arcing, development of machining instability, inability to raise the removal rate and excessive electrode wear, and the unsatisfactory machined surface quality. Still more important, the distortion of the discharge-current waveform cannot be neglected where narrow or extremely narrow power pulses are to be employed to seek to achieve a fine or super-fine EDM machined surface quality. Thus, there has hitherto been a practical limit in improving the surface finish of an EDM machined surface. Furthermore, the relative electrode wear may then amount to as high as 100% and render it impossible to achieve a desired finishing EDM operation.

OBJECTS OF THE INVENTION

It is, accordingly, an important object of the present invention to provide a novel and improved EDM surface method and apparatus capable of achieving a super-fine EDM finish.

Another object of the invention is to provide an EDM method and apparatus which enable an extremely fine finish to be achieved with an extremely low wear of the tool electrode.

Still another object of the invention is to provide an EDM method and apparatus which afford an excellent machined surface quality, better machining performance, an increased removal rate and a reduced tool wear.

SUMMARY OF THE INVENTION

It has now been discovered that the aforementioned adverse effect of the stray capacitance in the gap discharge circuit can be overcome by permitting electrical charge to be stored on the stray capacitance in the gap discharge circuit and by then discharging that electrical charge through an electrical shunt circuit in parallel with the machining gap immediately prior to initiation of each of the machining electrical discharges across the machining gap.

Thus, in accordance with the present invention there is provided in a first aspect thereof a method of electrical-discharge-machining an electrically conductive workpiece wherein a tool electrode is spacedly juxtaposed with the workpiece to define a machining gap therewith filled with a dielectric liquid, which method comprises: effecting a succession of localized, time-spaced and repetitive machining electrical discharges between the tool electrode and the workpiece across the machining gap to produce stock removal from the workpiece uniformly over the surface thereof juxtaposed with the tool electrode; and improving the surface finish of the stock-removal surface of the workpiece by discharging electrical charge stored due to a stray capacitance across the tool electrode and the workpiece, through an electrical shunt circuit in parallel with the machining gap immediately prior to initiation of each of the successive machining electrical discharges across the machining gap.

Specifically, the electrical charge is discharged through the gap shunt circuit by turning a shunt switch provided in the gap shunt circuit into conduction. The switch is turned into conduction following termination of the machining electrical discharge immediately preceding each of the machining electrical discharges. Preferably, the switch is turned into conduction after a predetermined delay time following the termination of the immediately preceding electrical discharge. The switch is held in conduction for a predetermined time duration which should preferably range between 10 and 100 nanoseconds.

The said succession of machining electrical discharges are effected by applying successive, time-spaced and repetitive electrical power pulses between the tool electrode and the workpiece across the machining gap. The successive power pulses may be applied across the machining gap by repetitively turning on and off a power switch connected in series with a DC source, the tool electrode and the workpiece. The shunt switch is then turned into nonconduction simultaneously when the power switch is turned on. The shunt switch may be turned into conduction immediately following the turn-off of the power switch but, preferably, after a predetermined delay time following the turn-off of the power switch. The shunt switch is held conducted for a predetermined time duration which should preferably range from 10 to 100 nanoseconds.

The invention also provides, in a second aspect thereof, an electrical discharge machining (EDM) apparatus comprising: means for positioning a tool electrode in spaced juxtaposition with a workpiece to define a machining gap therebetween; means for supplying a dielectric liquid into the machining gap, power-supply means for effecting a succession of localized, time-spaced and repetitive machining electrical discharges between the tool electrode and the workpiece across the machining gap to produce stock removal from the workpiece uniformly over the surface thereof juxtaposed with the tool electrode; and means for discharging electrical charge stored due to a stray capacitance across the tool electrode and the workpiece, through an electrical shunt circuit in parallel with the machining gap immediately prior to initiation of each of the machining electrical discharges across the machining gap.

Specifically, the means for discharging includes a shunt switch connected in the gap shunt circuit between the tool electrode and the workpiece and control means for turning the shunt switch into conduction to discharge the electrical charge through the gap shunt circuit. The control means is operable for turning the shunt switch into conduction following termination of the machining electrical discharge immediately preceding each of the machining electrical discharges. The control means is preferably operable for turning the shunt switch into conduction after a predetermined delay time following the termination of the immediately preceding machining electrical discharge and is operable for holding the shunt switch in conduction for a predetermined time duration. To this end, time-setting means is associated with the control means for setting the time duration in the range between 10 and 100 nanoseconds.

The power-supply means may comprise a pulse generator for applying successive, time-spaced and repetitive power pulses across the machining gap, thereby producing the succession of machining electrical discharges between the tool electrode and the workpiece. Specifically, the pulse generator may comprise a DC source, a power switch connected in series with the DC source, the tool electrode and the workpiece and pulsing means for repetitively turning on and off the power switch to provide the successive power pulses across the machining gap. The control means is then operable for turning the shunt switch into nonconduction substantially simultaneously when the power switch is turned on. The control means may be operable for turning the shunt switch into conduction substantially simultaneously with the turn-off of the power switch. Preferably, the control means is operable for turning the shunt switch into conduction after a predetermined delay time following the turn-off of the power switch which terminates the machining electrical discharge immediately preceding each of the machining electrical discharges. Time-setting means may preferably be associated with the control means for holding the shunt switch in conduction for a predetermined time period which should preferably range from 10 to 100 nanoseconds.

The pulse generator may also comprise a DC source, a capacitor connected in parallel with the DC source and the machining gap, a charging switch connected in series with the DC source and the capacitor, and pulsing means for repetitively turning on and off the capacitor-charging switch thereby to permit the capacitor to be repetitively charged by the DC source and the charge on the capacitor to be discharged through the machining gap to provide thereto the successive power pulses. The control means may then be operable for turning the shunt switch into conduction and holding it in conduction immediately prior to the turn-on of the charging switch.

The pulse generator may also comprise a DC source, a transformer having a primary winding connected via a power switch to the DC source and a secondary winding, a capacitor in parallel with the secondary winding and the machining gap, a unidirectional current conducting element connected between the secondary winding and the capacitor and pulsing means for repetitively turning on and off the power switch so that the capacitor is charged repetitively by input pulses which develop at the transformer secondary and the repetitive discharging of the charge on the capacitor provides the successive power pulses to the machining gap. The control means may then be operable for turning the shunt switch into conduction in phase with the turn-on of the power switch or alternatively for turning the shunt switch into conduction out of phase with the turn-on or in phase with the turn-off of the power switch to discharge the electrical charge due to the stray capacitance through the gap shunt circuit immediately prior to initiation of each of the machining electrical discharges across the machining gap.

BRIEF DESCRIPTION OF THE DRAWING

These and other objects and features of the present invention as well as advantages thereof will become more readily apparent from the following description taken with reference to the accompanying drawing in which.

SPECIFIC DESCRIPTION

Figure 1:
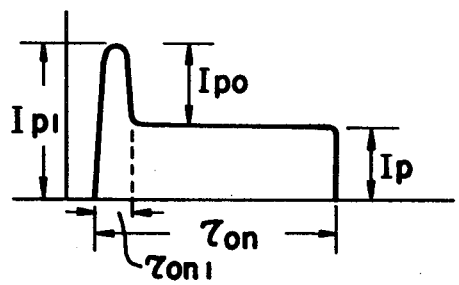
FIG. 1 is a waveform diagram schematically illustrating a discharge or machining current pulse which develops across an EDM gap and exhibits a distortion due to stray capacitance commonly present in the gap discharge circuit in an EDM circuit arrangement.

In conventional EDM circuit arrangements, a stray capacitance is generated generally across the EDM gap between the tool electrode and the workpiece separated by a dielectric liquid and also is included at the interfaces between the elements in the gap discharge circuit. It has been observed that the gap stray capacitance amounts to 100 picofarads or more when the dielectric liquid is constituted, say, by kerosene having a specific resistivity of $10^{10}$ to $10^{12}$ ohm-cm and the tool electrode has a machining area in excess of 4 cm$^2$. When stray capacitances at the various interfaces of the elements are included, the total value even reaches 1 microfarad or more. On the other hand, it has been recognized that a pulse discharge generated across the machining gap has a distorted current waveform as schematically shown in FIG. 1. The present inventor has recognized this to be due to the stray capacitance inherently existent in the gap discharge circuit. In FIG. 1, it is shown that the pulse comprises a portion of a current magnitude Ip and a duration $\tau$on produced when the DC EDM power supply is pulsed by means of the on-off switch, and an initial portion of a peak current Ip$_1$ (=Ip$_0$+Ip) and a duration $\tau$on1 appearing at the leading edge of the pulse due to the stray capacitance in the gap discharge circuit. The additional current Ip$_0$ superimposed on the current magnitude Ip to produce the initial peak current Ip$_1$ and the time $\tau$on1 are expressed as follows:

$$Ip_0 \phi E\sqrt{C/L} \qquad (1)$$

$$\tau on1 \phi E\sqrt{LC} \qquad (2)$$

where C is the stray capacitance, L is the inductance and E is the source voltage. It is seen that both Ip$_1$ and $\tau$on1 increase as the stray capacitance becomes greater; a machine with a large C has a large Ip$_1$ which means a large deviation of the effective peak current I$_{peff}$ from a preset value Ip, which in turn represents a significant change in operational settings to a desired machining result.

It has been recognized that surface roughness is given by the formula:

$$R = K_R I_{peff}^{0.4} \tau_{on}^{0.3} \quad (3)$$

where $K_R$ is a constant. Removal rate is given by the formula:

$$W = K_W I_{peff}^{1.4} \tau_{on}^{1.1} \quad (4)$$

where $K_W$ is constant. Thus, it is apparent that substantial changes are caused in these desired EDM end result factors with a change in the effective peak current $I_{peff}$ caused by the addition of $I_{p0}$ to the preset $I_p$. The change or influence is especially great in finish operations in general, and also in wire-cut and other EDM operation in general using a water (distilled or weakly conductive) machining liquid having a relatively high specific induced capacitance.

The present invention seeks to provide a novel arrangement whereby the adverse influence of the stray capacitance in the gap discharge circuit on the surface finish and other machining end result factors is effectively eliminated.

Figure 2:
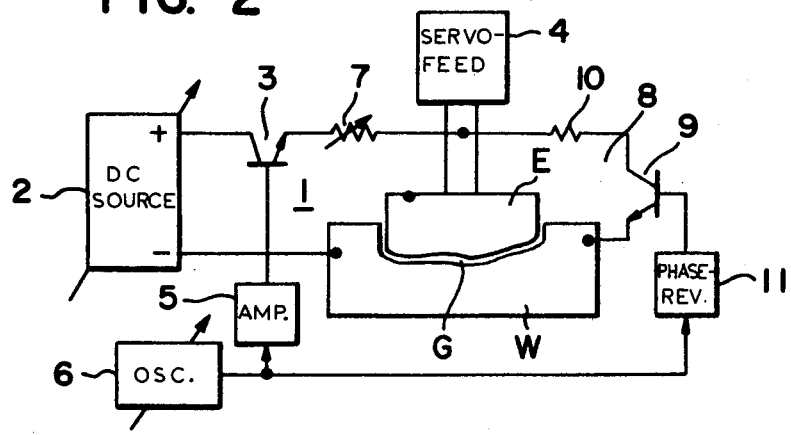
FIG. 2 is a circuit diagram schematically illustrating a first embodiment of the present invention.

Referring now to FIG. 2, there is shown an EDM circuit arrangement for embodying the present invention whereby the presence of the adverse stray capacitance is effectively circumvented. The arrangement shown includes a conventional EDM power supply 1 comprising a DC source 2 and a power switch 3 connected in series with the DC source 2 and an EDM gap G formed between a tool electrode E and a workpiece W and filled with a dielectric liquid which may, for example, be Kerosene, transformer oil or distilled water and is supplied from a conventional dielectric supply unit (not shown). The tool electrode E is advanced into the workpiece W by a servofeed unit 4 which functions to maintain the machining gap substantially constant.

The power switch 3 may as is typically be a bank of transistors and is energized via an amplifier stage 5 by signal pulses furnished by an oscillator 6 and is thereby turned on and off repetitively to provide a sequence of time-spaced and repetitive electrical power pulses across the EDM gap G. Thus, a succession of time-spaced, repetitive, localized and randomly dispersed machining electrical discharges are produced between the tool electrode E and the workpiece W across the machining gap G to remove stock from the workpiece W uniformly over the surface thereof juxtaposed with the tool electrode E. The output voltage of the DC source 2 is adjusted to establish the spark-over voltage of each machining electrical discharge at a desired value whereas a variable resistor 7 in the power circuit 1 is adjusted to set up a desired current magnitude $I_p$ of each machining electrical discharge (FIG. 1). The discharge duration or on-time $\tau_{on}$ as well as the pulse off-time $\tau_{off}$ or time interval between successive machining pulses is basically set up in the signal pulser 6.

Figure 3A:
FIGS. 3(a) and 3(b) are waveform diagrams illustrating respectively control pulses (A) for producing machining electrical discharges and gap-shunting pulses (B) in the arrangement of FIG. 2.
Figure 3B:

In accordance with the present invention, the pulse generator 1 incorporates a gap shunt circuit 8 connected to the tool electrode E and the workpiece W in parallel with the machining gap G and including a gap shunt switch 9. This switch is shown by a transistor having its emitter and collector and electrodes connected to the series circuit that includes in series the workpiece W, the machining gap G and the tool electrode E and a resistor 10 which represents the circuit resistance of the gap shunt circuit 8. The base electrode of the gap shunt switch 9 is shown to be energizable by a phase-reversing circuit 11 leading from the oscillator 6 which controls the power switch 3. The circuit 11 is thus adapted to respond to successive signals pulses as shown by A in FIG. 3(a) from the oscillator 6, to provide successive signal pulses as shown by B in FIG. 3(b) in phase opposition to the signal pulses shown at A and to turn on and off the gap shunt switch 9 with the signal pulses B. It will be apparent that the switch 9 is turned on when the switch 3 is turned off. And the switch 9 is turned off when the switch 3 is turned on. As a consequence, for each machining pulse cycle, the charge on the stray capacitance is released or discharged through the short-circuited gap shunt circuit 8 up to the time instant when the machining electrical discharge is initiated by the turn-on of the power switch 3. This effectively eliminates the added current component $I_{p0}$ in $I_{p1}$ shown in FIG. 1 and renders the machining discharge current waveform to be of a desirable rectangular shape precisely determined by the current magnitude $I_p$ and the pulse duration $\tau_{on}$ established at the aforementioned settings in the pulse generator 1.

Figure 4:
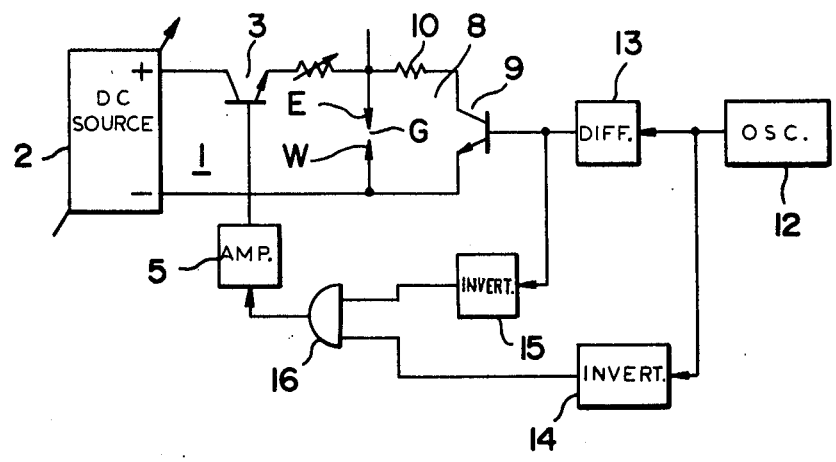
FIG. 4 is a circuit diagram schematically illustrating a second embodiment of the present invention.
Figure 5A:
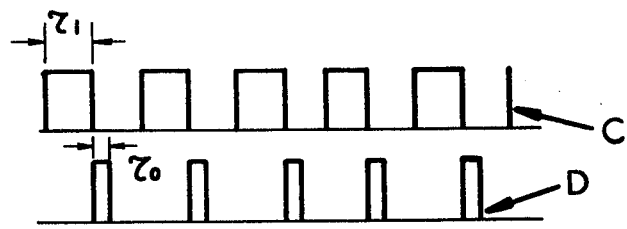
FIGS. 5(a), 5(b), 5(c), 5(d) and 5(e) are waveform diagrams illustrating various signal pulses (C), (D), (E), (F) and (G) which develop at different portions in the arrangement of FIG. 4.
Figure 5B:
Figure 5C:
Figure 5D:
Figure 5E:

The modified arrangement shown in FIG. 4 in which the same reference numerals and symbols as in FIG. 2 designate the same components includes a signal source 12 constituted by an oscillator which furnishes signal pulses of preset on-time, off-time and frequency designated by C in FIG. 5(a). The output of the oscillator 12 is applied to a differentiator circuit 13 and to a phase-reversing circuit 14. The output of the differentiator circuit 13 is shown by D in FIG. 5(b) and is applied to the gap shunt switch 9 and a futher phase-reversing circuit 15 whose output is shown by E in FIG. 5(c). The output of the phase-reversing circuit 15 i.e. pulses E and the output of the phase-reversing circuit 14 shown by pulses F in FIG. 5(d) are combined at an AND gate 16 whose output thus assumes a waveform shown by pulses G in FIG. 5(e). The output of the AND gate 16 or a succession of signal pulses G is applied via an amplifier 5 to the power switch 3 to repetitively turn on and off the latter and this provides a succession of electrical power pulses across the EDM gap G, thereby effecting successive machining electrical discharges between the tool electrode E and the workpiece W to remove stock from the workpiece W from the surface thereof juxtaposed with the tool electrode E. It will be apparent that each D pulse develops at the trailing edge of each C pulse and hence at the leading edge of each G pulse. The gap shunt switch 9 is turned into conduction and held conductive to short-circuit the EDM gap for a shunt time duration $\tau_0$ (FIG. 5(b)) immediately prior to initiation of each machining pulse G. Thus, for each machining pulse cycle G, the charge on the stray capacitance has been released or discharged through the short-circuited gap shunt circuit 8 up to the time instant when the machining electrical discharge is initiated by the turn-on of the power switch 3. Each gap-shunting pulse D terminates when the power switch 3 is turned on. It has been found that a short time duration $\tau_0$ of 10 to 100 nanoseconds of the gap shunting pulse D is sufficient and advantageous to achieve complete discharging of the electrical charge on the stray capacitance amounting to 100 to 1000 picofarads in the gap discharge circuit. The time-constant network for the D-pulse determining circuit should accordingly be preset. It will be apparent that each D pulse is triggered after a fixed delay time which follows termination of each machining pulse G and which is here equal to the duration $\tau_1$ of signal pulses C. The effective elimination of the added current component $I_{p0}$ or in $I_{p1}$ in FIG. 1 is again in the embodiment of FIG. 4 achieved to render each machining discharge current waveform rectangular with a current magnitude Ip and a pulse duration precisely adjusted at the setting circuits.

Figure 6:
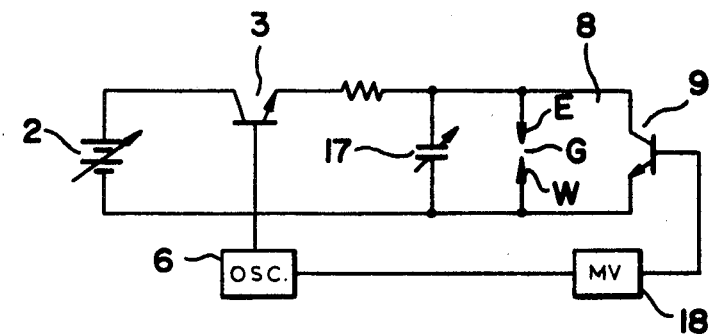
FIGS. 6 and 7 are circuit diagrams schematically illustrating further embodiments of the present invention.
Figure 7:
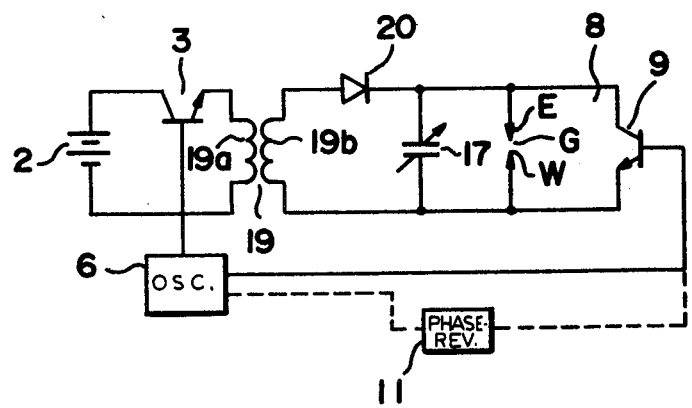

The pulse generator for applying a succession of time-spaced repetitive power pulses across the machining gap G may also be one as shown in FIG. 6 or one as shown in FIG. 7. In these FIGURES, too, the same reference numerals and symbols as in the previous FIGURES are used to refer to the same components.

The arrangement of FIG. 6 comprise a DC source 2, a storage capacitor 17 connected in parallel to the DC source 2 and the EDM gap G and a power switch 3 connected in series between the DC source 2 and the capacitor 17. The power switch 3 is turned on and off repetitively with signal pulses furnished from an oscillator 6 to periodically charge the capacitor 17 and to permit the charge stored thereon in each charging cycle to be discharged through the EDM gap to provide a succession of time-spaced repetitive impulses thereat. In this arrangement, a one-shot multivibrator 18 is provided responsive to each signal pulse of the oscillator 6 to provide a short-duration pulse of a duration of 10 to 100 nanoseconds and thereby to render the gap shunt switch 9 conductive. The switch 9 is turned into conduction and held conductive for the short time period of this duration which occurs at the leading edge of each signal pulse of the oscillator 6. When each signal pulse ends, the charge on the storage capacitor 17 is discharged through the machining gap G. The discharging of the capacitor 17 terminates at an instant prior to the turn-on of the power switch 3 or before a signal pulse from the oscillator builds up. When this signal pulse occurs, the capacitor 17 commences charging thereon. It will be apparent that it is subsequent to termination of the discharging of the capacitor 17 and prior to the charging voltage building up on the capacitor 17 which the short-duration pulse is issued from the one-shot multivibrator 18 and renders and holds the gap shunt switch 9 conductive to short-circuit the EDM gap through the gap shunt circuit 8. As a consequence, for each machining pulse cycle, the charge on the stray capacitance in the gap discharge circuit has been released or discharged through the short-circuited gap shunt circuit 8 up to the time instant when the machining electrical discharge is initiated by discharging of the capacitor 17 through the machining gap G.

The arrangement of FIG. 7 comprises a variable-output DC source 2, a transformer 19 having a primary winding 19a connected in series with the DC source 2 via a power switch 3 and a secondary winding 19b, a storage capacitor 17 connected in parallel with the secondary winding 19b of the transformer 19 and the EDM gap G and a unidirectional current conducting element or diode 20 connected in series between the secondary winding 19b and the storage capacitor 17. The power switch 3 is repetitively turned on and off with a succession of signal pulses furnished from an oscillator 6 to apply a succession of output pulses to the primary winding 19a of the transformer 19. The latter then develops at its secondary winding 19b transformed bi-directional output pulses which are rectified by the diode 20 into a succession of unidirectional pulses. The storage capacitor 17 is periodically charged with the latter pulses and the charge stored on the capacitor 17 in each charging cycle is discharged through the EDM gap G to provide a succession of time-spaced and recurrent impulses thereat. It will be apparent that the charging pulses each of which is synchronous with the trailing edge of each signal pulse from the oscillator are applied to the storage capacitor 17. In this case, the gap shunt switch 9 may be turned into conduction and held conductive for the duration of each signal pulse from the oscillator 6. In each cycle, the discharging of the capacitor 17 terminates prior to the turn-on of the power switch 3 or before each signal pulse of the oscillator 6 develops. When this signal pulse terminates, the capacitor 17 commences charging in response to the corresponding output pulse which develops at the secondary winding 19b of the transformer 19. It will thus be apparent that the gap shunt switch 9 is held conductive to short-circuit the machining gap G through the gap shunt circuit 8 after a delay time following the termination of each discharging of the storage capacitor 17 or each machining pulse and prior to initiation of each charging of the capacitor 17 and hence immediately prior to initiation of each machining pulse.

When the coupling of the transformer 19 is made so as to allow each charging pulse to develop for the storage capacitor 17 synchronously with the leading edge of each signal pulse from the oscillator 6, a phase-reversing circuit 11 may be provided between the oscillator 6 and the gap shunt switch 9. In this case, the gap shunt switch 9 is turned into conduction and held conductive for the duration of the time interval between successive signal pulses of the oscillator 6. In each cycle, the discharging of the capacitor 17 terminates prior to the turn-on of the gap shunt switch 9. Thus, here again, the gap shunt switch 9 is turned on and held conductive to short-circuit the machining gap G through the gap shunt circuit 8 after a delay time following the termination of each discharging of the storage capacitor 17 or each machining pulse and prior to initiation of each charging of the capacitor 17 and hence immediately prior to initiation of each machining pulse.

It will be appreciated that the present invention effectively circumvents the adverse effect of the stray capacitance in the gap discharge circuit. The method of the invention is extremely advantageous for EDM operation in a fine and ultra-fine finishing range utilizing machining pulses of an on-time or pulse duration of 0.1 to 10 microseconds. For example, in machining a steel workpiece with a copper tool electrode and using a succession of machining electrical pulses having a pulse on-time $\tau on$ and off-time $\tau off$ each of 3 microseconds and a current magnitude of 2 amperes, it has been revealed that the practice of the present invention yields an EDM surface roughness of 2.5 $\mu$Rmax and a relative electrode wear (E/W) by volume of 0.4%. This represents a marked improvement over the conventional practice which only allows a surface roughness and relative electrode wear which are as great as 4.8 $\mu$Rmax and 2.4%, respectively.

What is claimed is:

1. A method of electrical-discharge-machining an electrically conductive workpiece wherein a tool electrode is spacedly juxtaposed with the workpiece to define a machining gap therewith filled with a dielectric liquid, which method comprises:

effecting a succession of localized, time-spaced and repetitive machining electrical discharges between said tool electrode and said workpiece across said machining gap to produce stock removal from said workpiece over the surface thereof juxtaposed with said tool electrode; and improving the surface finish of said stock-removed surface of the workpiece by discharging electrical charge stored due to a stray capacitance across said tool electrode and said workpiece during each time interval between the successive machining electrical discharges, through an electrical shunt circuit in parallel with said machining gap immediately prior to initiation of each of said machining electrical discharges across said machining gap.

2. The method defined in claim 1 wherein said electrical charge is discharged through said gap shunt circuit by turning a shunt switch in said circuit into conduction.

3. The method defined in claim 2 wherein said switch is turned into conduction following termination of the machining electrical discharge immediately preceding said each of the machining electrical discharges.

4. The method defined in claim 3 wherein said switch is turned into conduction after a predetermined delay time following the termination of said immediately preceding electrical discharge.

5. The method defined in claim 3 or claim 4 wherein said switch is held in conduction for a predetermined time duration.

6. The method defined in claim 5 wherein said time duration is in the range between 10 and 100 nanoseconds.

7. The method defined in claim 2 wherein said succession of machining electrical discharges are effected by applying successive, time-spaced and repetitive electrical pulses between said tool electrode and said workpiece across said machining gap.

8. The method defined in claim 7 wherein said electrical pulses are applied across said machining gap by repetitively turning on and off a power switch connected in series with a DC source, said tool electrode and said workpiece and said shunt switch is turned into nonconduction substantially simultaneously when said power switch is turned on.

9. The method defined in claim 8 wherein said shunt switch is turned into conduction immediately following the turn-off of said power switch.

10. The method defined in claim 8 wherein said control switch is turned into conduction after a predetermined delay time following the turn-off of said power switch.

11. The method defined in claim 9 or claim 10 wherein said shunt switch is held in conduction for a predetermined time duration.

12. The method defined in claim 11 wherein said time duration is in the range between 10 and 100 microseconds.

13. The method defined in claim 1 wherein said dielectric liquid has an electrical resistivity not less than $10^3$ ohm-cm.

14. The method defined in claim 13 wherein said dielectric liquid is kerosene having an electrical resistivity in the range between $10^2$ and $10^{12}$ ohm-cm and said stray capacitance is in excess of 100 picofarads.

15. An electrical discharge machining apparatus having means for positioning a tool electrode in spaced juxtaposition with a workpiece to define a machining gap therebetween and means for supplying a dielectric liquid into the machining gap, which apparatus comprises:

a power-supply means for effecting a succession of localized, time-spaced and repetitive machining electrical discharges between the tool electrode and the workpiece across the machining gap to produce stock removal from the workpiece over the surface thereof juxtaposed with the tool electrode; and means for discharging electrical charge stored due to a stray capacitance across said tool electrode and said workpiece during each time interval between the successive machining electrical discharges, through an electrical shunt circuit in parallel with said machining gap immediately prior to initiation of each of said machining electrical discharges across said machining gap.

16. The apparatus defined in claim 15 wherein said means for discharging includes a shunt switch connected in said circuit between said tool electrode and said workpiece and control means for turning said shunt switch into conduction to discharge said electrical charge through said circuit.

17. The apparatus defined in claim 16 wherein said control means includes means for turning said shunt switch into conductin following termination of the machining electrical discharge immediately preceding said each of the machinng electrical discharges.

18. The apparaus defined in claim 17 wherein said control means includes means for turning said shunt switch into conduction after a predetermined delay time following the termination of said immediately preceding machining electrical discharge.

19. The apparatus defined in claim 17 or 18 wherein said control means includes means for holding said shunt switch in conduction for a predetermined time duration.

20. The apparatus defined in claim 19 wherein said means for discharging further includes time-setting means for setting said time duration in the range between 10 and 100 nanoseconds.

21. The apparatus defined in claim 16 wherein said power-supply means comprises a pulse generator for applying successive, time-spaced and repetitive pulses across said machining gap, thereby producing said succession of machining electrical discharges between said tool electrode and said workpiece.

22. The apparatus defined in claim 21 wherein said pulse generator includes a DC source, a power switch connected in series with said DC source, said tool electrode and said workpiece and pulsing means for repetitively turning on and off said power switch to provide said successive electrical pulses across said machining gap and wherein said control means is operable for turning said shunt switch into nonconduction substantially simultaneously when said power switch is turned on.

23. The apparatus defined in claim 22 wherein said control means includes means for turning said shunt switch into conduction substantially simultaneously with the turn-off of said power switch.

24. The apparatus defined in claim 22 wherein said control means includes means for turning said shunt switch into conduction after a predetermined delay time following the turn-off of said power switch which terminates the machining electrical discharge immediately preceding said each of machining electrical discharges.

25. The apparatus defined in claim 23 or claim 24 wherein said control means includes means for holding said shunt switch in conduction for a predetermined time duration.

26. The apparatus defined in claim 25, further comprising time-setting means associated with said control means for setting said time duration in the range between 10 and 100 nanoseconds.

27. The apparatus defined in claim 21 wherein said pulse generator comprises a DC source, a capacitor connected in parallel with said DC source and said machining gap, a charging switch connected in series with said DC source and said capacitor, and a pulsing means for repetitively turning on and off said charging switch thereby to permit said capacitor repetitively to be charged by said DC source and the charge on said capacitor to be discharged through said machining gap and wherein said control means is operable for turning said shunt switch into conduction and holding it in conduction for a predetermined time period immediately prior to the turn-on of said charging switch.

28. The apparatus defined in claim 21 wherein said pulse generator comprises a DC source, a transformer having a primary winding connected via a power switch to said DC source and a secondary winding, a capacitor connected in parallel with said secondary winding and said machining gap, a unidirectional current conducting element connected between said secondary winding and said capacitor and pulsing means for repetitively turning on and off said power switch.

29. The apparatus defined in claim 28 wherein said control means includes means for turning said shunt switch into conduction substantially in phase with the turn-on of said power switch.

30. The apparatus defined in claim 28 wherein said control means includes means for turning said shunt switch into conduction substantially in phase with the turn-off of said power switch.

* * * * *